UNITED STATES PATENT OFFICE.

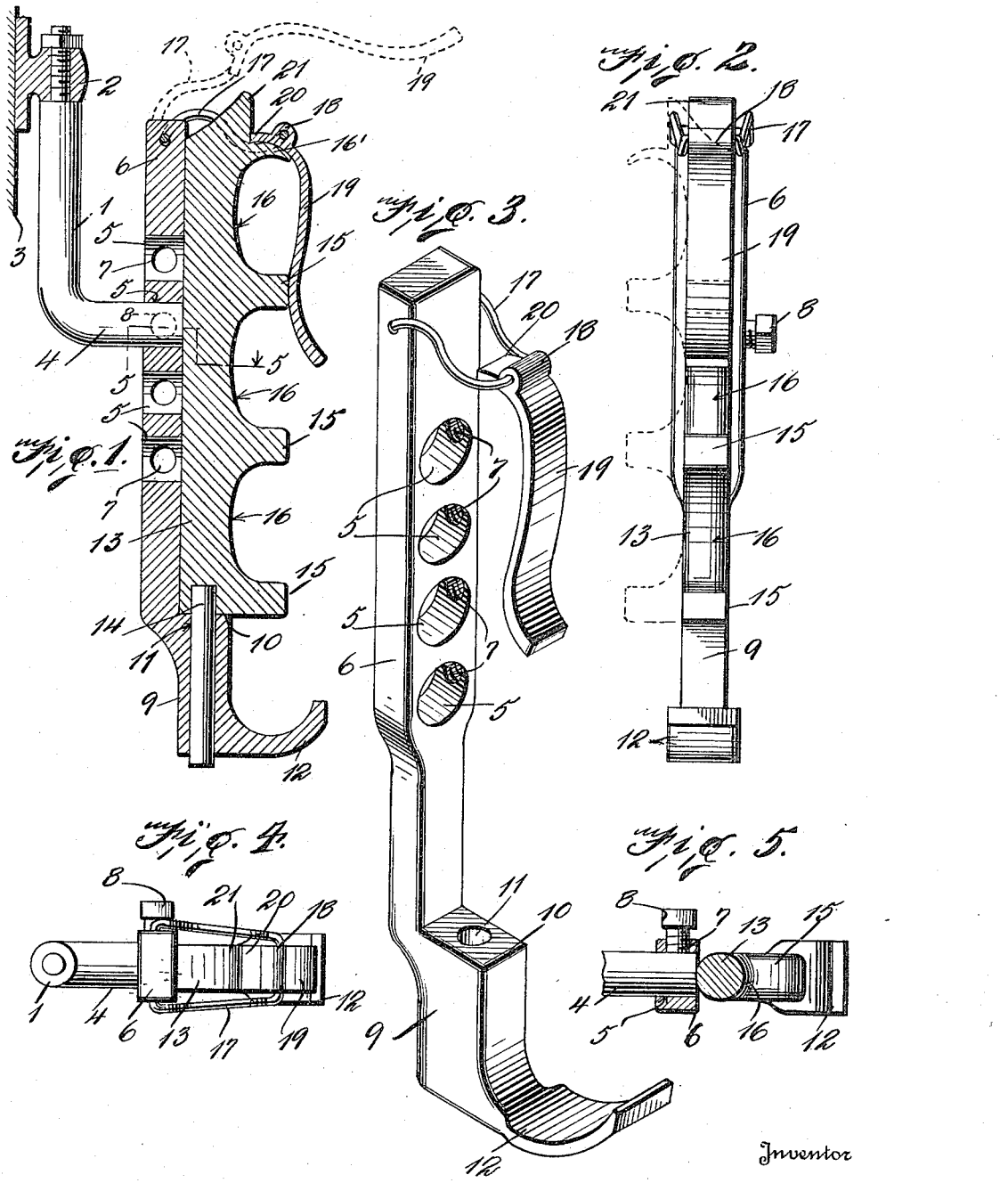

GEORGE EWARD ROBINSON, OF EUGENE, OREGON, ASSIGNOR OF ONE-HALF TO ALBERT C. FINSETH, OF EUGENE, OREGON.

SWIVEL AUTOMOBILE-BOW SEPARATOR.

1,209,760.

Specification of Letters Patent.

Patented Dec. 26, 1916.

Application filed May 18, 1915. Serial No. 28,925.

*To all whom it may concern:*

Be it known that I, GEORGE EWARD ROBINSON, citizen of the United States, residing at Eugene, in the county of Lane and State of Oregon, have invented certain new and useful Improvements in Swivel Automobile-Bow Separators, of which the following is a specification, reference being had therein to the accompanying drawing.

This invention relates to a swivel automobile bow separator, and has for its principal object the production of a simple and efficient means for releasably retaining the bows of the top in a compact position when the top is folded.

Another object of this invention is the production of a bow separator which is provided with a pivoted bar so as to facilitate the folding of the bows at which time the bar may be swung so as to separately carry each bow in a folded position.

Another object of this invention is the production of a bow separator provided with a latch lever for the purpose of retaining the pivoted bar against accidental movement after the same has been swung into engagement with the folded bows.

In the accompanying drawing: Figure 1 is a vertical section of the swivel automobile bow separator showing the same in position for use. Fig. 2 is a front elevation of the device as constructed in accordance with this invention. Fig. 3 is a detailed perspective view of the device the pivot bar being removed. Fig. 4 is a top plan view of the bow separator. Fig. 5 is a section taken on the line 5—5 of Fig. 1.

Referring to the accompanying drawings by numerals it will be seen that 1 designates the suspended bolt that is carried by means of the bracket 2 in the usual position upon the body of an automobile or other vehicle 3. The lower end of this suspended bolt extends laterally as shown at 4 so as to be detachably positioned within one of the enlarged openings 5 formed in the supporting body 6.

The supporting body 6 is elongated and has the enlarged openings 5 extending therethrough so as to communicate with the transverse internally threaded apertures 7. The set screw 8 passes through a selected one of the apertures 7 so as to communicate with the interior of one of the openings 5. Therefore, when the lateral end 4 of the suspended bolt 1 is positioned within one of the selected openings 5, the set screw may be passed through the desired aperture 7 so as to bind upon the lateral end 4 as clearly disclosed in Fig. 5 for detachably retaining the body 6 upon the lateral end. This body 6 is provided with a thickened lower end 9, forming a shoulder 10, which shoulder 10 extends at right angles to the body 6. The vertical bore 11 extends entirely through the thickened portion 9 as shown in Fig. 1 for purposes to be hereinafter set forth. This thickened portion 9 terminates at its lower portion in the integral bow-supporting plate 12 extending for a suitable distance beyond its forward portion.

The pivoted bar 13 is provided with a pivot pin 14 which is fixedly carried by its lower end in any suitable manner. This pin 14 is adapted to extend within the vertical bore 11 of the thickened portion 9 so as to pivotally support the bar 13 upon the upper portions of the shoulder 10 whereby when so desired the bar 13 may be swung to either side as disclosed in dotted lines in Fig. 2. This bar 13 has forwardly extending projections or ribs 15 formed thereon so as to provide the pocket portions 16 at spaced intervals upon the forward portions thereof. When the device is in use the projections 15 are adapted to fit between the bows of the top thereby separating the bows for positively retaining the same in their correct positions and prevent the same from rattling.

A resilient wire link 17 is pivotally secured to the upper end of the body 6 in such a manner as to allow the link to be freely swung in a desired direction when desired. This link has its side portions curved throughout their entire length so as to produce a resilient structure which converges toward its forward end so as to pass through a bearing lug 18 of the latch lever 19. This latch lever 19 has a lip 20 formed upon the rear side of the lug 18 for the purpose of resting upon the upper projection 16′ of the bar 13 when the device is in position.

When the device is in operation it is adapted to be supported adjacent the rear portions of an automobile body or any other desired position thereon which will facilitate the engagement thereof by the bow of the automobile top when the top is folded. Before folding the top, the latch lever 19 is